(12) United States Patent
Chovan

(10) Patent No.: US 6,556,288 B1
(45) Date of Patent: Apr. 29, 2003

(54) DISTRIBUTED DISPLACEMENT SENSOR

(75) Inventor: Joseph L. Chovan, Syracuse, NY (US)

(73) Assignee: Lockheed Martin Corporation

( * ) Notice: Subject to any disclaimer, the term of this patent is extended or adjusted under 35 U.S.C. 154(b) by 178 days.

(21) Appl. No.: 09/745,210

(22) Filed: Dec. 21, 2000

Related U.S. Application Data

(60) Provisional application No. 60/172,965, filed on Dec. 21, 1999.

(51) Int. Cl.[7] .......................... G01B 11/26; G01B 11/14
(52) U.S. Cl. ....................................... 356/138; 356/614
(58) Field of Search ................................. 356/138, 626, 356/614; 250/227.16, 227.24, 227.28, 221, 224; 73/655

(56) References Cited

U.S. PATENT DOCUMENTS

| | | | |
|---|---|---|---|
| 4,420,251 A | * 12/1983 | James et al. | .................... 356/32 |
| 4,947,693 A | 8/1990 | Szuchy et al. | ................ 73/800 |
| 5,469,254 A | * 11/1995 | Konomura | .................... 348/65 |
| 5,898,517 A | * 4/1999 | Weis | ............................. 356/32 |
| 5,900,556 A | 5/1999 | Ahmad et al. | ................. 73/800 |
| 5,946,094 A | * 8/1999 | Sahlgren et al. | ............. 356/477 |
| 6,012,337 A | 1/2000 | Hodge | ........................... 73/803 |
| 6,127,672 A | * 10/2000 | Danisch | ................. 250/227.14 |

* cited by examiner

Primary Examiner—Michael P. Stafira
(74) Attorney, Agent, or Firm—Duane Morris LLP

(57) ABSTRACT

A system and method for monitoring deformations in a cavity comprising a method for sensing deformations within a body comprising inserting into the body an optical, deformable probe having a plurality of imaging devices spaced at predetermined positions within the probe, providing a light source for illuminating the probe at a first time instant, processing first composite imaging information in response to activation of the light source; at a second time instant, processing second composite imaging information in response to activation of the light source; and comparing the processed first and second imaging information to obtain positional information indicative of movement of at least a portion of the probe occurring between the first and second time instants.

22 Claims, 3 Drawing Sheets

US 6,556,288 B1

DISTRIBUTED DISPLACEMENT SENSOR

RELATED APPLICATION

This application claims priority of U.S. patent application No. 60/172,965, entitled DISTRIBUTED DISPLACEMENT SENSOR, filed Dec. 21, 1999, the entire disclosure of which is hereby incorporated by reference.

FIELD OF THE INVENTION

This invention relates generally to sensor systems and methods and more particularly to optical displacement sensors and techniques.

BACKGROUND OF THE INVENTION

Numerous types of sensors and early warning systems have been used to monitor and/or detect deformations within a body or structure. Such systems are often used to monitor deformations in large, civil structures such as buildings, bridges, roadways and the like, in order to detect and assess the degree of displacement or shift of the structure. Such sensor systems are particularly useful for determining if excessive transient deformations have occurred which might render the structure unsafe. Such deformations may occur as a result of earthquakes, tremors, vibrations, sudden impacts, climate changes and other events, for example.

Present techniques for monitoring such deformations include using a tube which is fed into a cavity formed within the structure to be monitored and an inclinometer is lowered down through the tube for periodically monitoring deformations. Such a technique, however, is labor intensive, especially at remote locations, and consequently is performed on an infrequent basis. In addition, precision grooved tracks are normally required for use with the inclinometer.

A system and method that provides rapid and efficient monitoring and detection of deformations within a body or structure and which can provide frequent or even continuous monitoring of the structure to determine relative structural displacement in a cost effective manner is highly desired.

SUMMARY OF THE INVENTION

An apparatus for sensing deformations within a body comprises a deformable conduit comprising a plurality of imaging devices at predetermined positions within the conduit, the plurality of imaging devices responsive to an optical source for providing imaging data, and a detector for processing the imaging data to obtain positional information indicative of movement of at least a portion of the conduit from a prior position.

A method for sensing deformations within a body comprises inserting into the body an optical, deformable probe having a plurality of imaging devices spaced at predetermined positions within the probe; providing a light source for illuminating the probe; at a first time instant, processing first composite imaging information from the imaging devices in response to activation of the light source; at a second time instant, processing second composite imaging information from the imaging devices in response to activation of the light source; and comparing the processed first and second imaging information to obtain positional information indicative of movement of at least a portion of the probe occurring between the first and second time instants.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily to scale.

DETAILED DESCRIPTION OF THE INVENTION

Before embarking on a detailed discussion, the following should be understood. The present invention described herein is useful for monitoring earth motion. However, the concepts and embodiments described herein have additional applications, such as for monitoring deformations of buildings, bridges, roadways and the like. Furthermore, this same concept has potential application in regard to monitoring towed array systems by permitting monitoring deformations of towed arrays to implement more precise beamforming, for example.

The concept is based on a conduit or tube made of a durable, deformable material such as plastic which is vertically buried in the ground with its bottom anchored in bedrock (or clamped to a building or bridge structure), for example, and which deforms as the underground earth drifts (or the building or bridge structured forms). The approach disclosed herein uses optical techniques to monitor deformations and a remote telemetry link to report these deformations to a central data bank. The system according to the present invention operates without the need for precision grooved tracks normally required for inclinometer-based sensor systems.

The system and method disclosed herein permits automatic monitoring on an arbitrarily fast time schedule with data recorded and eventually transmitted via an appropriate telemetry link. In the event of an emergency, an appropriate alarm (such as an automatic phone call on a cellular phone link) can be initiated by the sensor system.

Figure 1:
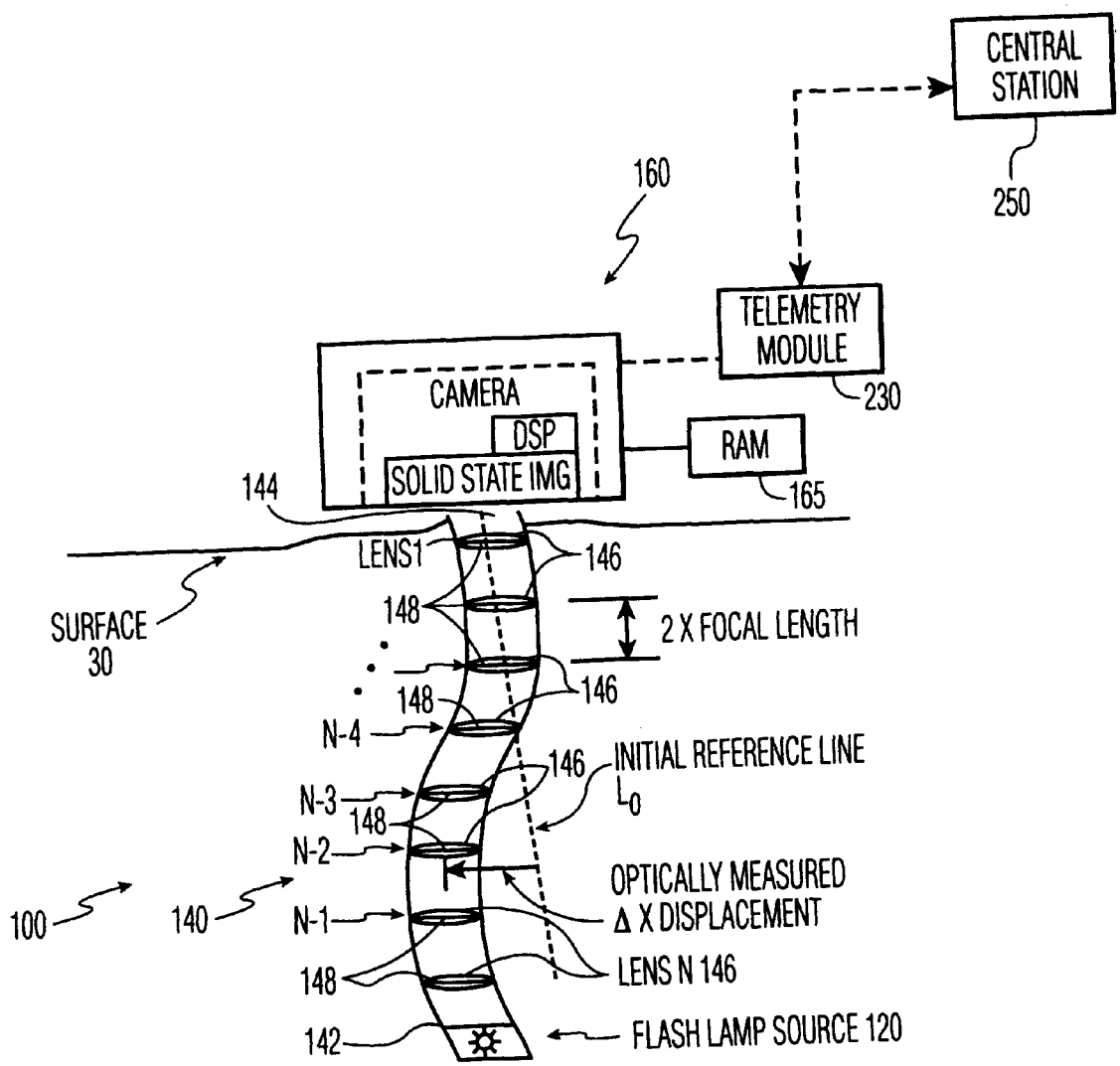
FIG. 1 is a schematic illustration of an optical monitoring system according to the present invention.

Referring now to FIG. 1, there is shown a schematic illustration of a sensor system 100 according to an aspect of the present invention. Throughout the drawings, like reference numerals are used to indicate like parts. The system comprises an optical source 120 such as a flash lamp light source positioned at a bottom end 142 of a deforrmable conduit or probe 140 such as a plastic tube or pipe. Other rugged, durable, deformable materials are also contemplated, such as rubber, for example. A series of lenses 146 are disposed within the interior of the conduit and spaced at about twice their focal length along the extent of conduit 140 such that each lens images the plane of the adjacent lower lens onto the plane of the adjacent upper lens. This lens structure guides the light around the bends in the conduit as the earth motion deforms it. The lenses are preferably fastened to the interior of the conduit via adhesive means such as tape, epoxy and the like, so as to remain substantially fixed. Other fastening means are also contemplated, including bonding, frits and the like. The probe is then inserted into a cavity formed at surface 30 of the structure or body to be sensed along an initial reference line $L_o$, where the probe is sized to fit within the cavity while engaging side portions of the cavity. At a first time instant, initial positional data is obtained by processing first composite imaging information from the imaging devices 145 in response to activation of the light source. This initial calibration effectively provides a reference point from which to measure any optical displacement $\Delta x$. Then, at a second time instant, second composite imaging information from the imaging devices is processed in response to activation of the light source. The processed first and second imaging information is then compared to obtain positional information indicative of movement $\Delta x$ of at least a portion of the conduit occurring between the first and second time instants.

Figure 2:
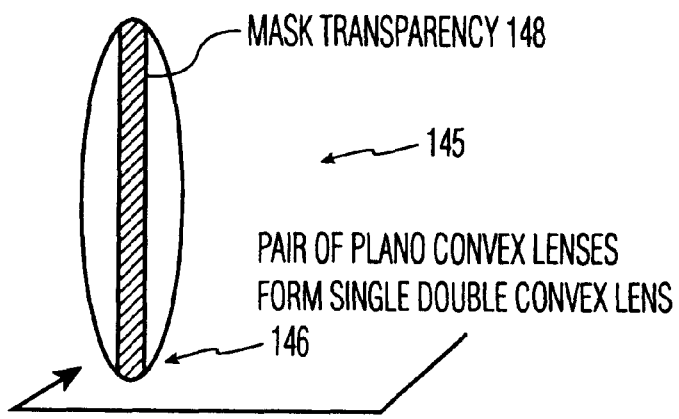
FIG. 2 is a schematic view of an imaging device comprising a masked transparency and lens unit according to an aspect of the present invention.

Referring now to FIG. 2 (in conjunction with FIG. 1) each lens plane also contains a low contrast optical transparency mask or image mask 148. In a preferred embodiment, the transparencies at each plane are sandwiched between two plano convex lenses so that an imaging device 145 comprising a symmetrical double convex lens 146 with a transparency mask 148 at its center results. This is illustrated schematically in FIG. 2. It is to be understood that while a convex lens has been described for imaging the information onto a focal plane, other lens designs may also be used, such as concave lenses, for example.

As a result of this arrangement, two sets of mask images are relayed upstream through conduit 140 by the lens and mask arrangement. As shown in FIG. 1, numbering the lenses (and corresponding masks) from 1 to N, where N is the bottom most lens in the conduit, lens (N-1) images mask N onto the mask and lens at (N-2). Thus two masks are superimposed at this plane. Lens (N-3) in turn images this mask combination to the plane of lens (N-4) where the images of masks N and (N-2) are combined with the mask at (N-4). This process continues, accumulating additional superimposed mask images until every other mask is imaged onto a common plane at the top end 144 of the conduit.

A similar process occurs with the masks at planes (N-1), (N-3), (N-5), etc., until the images appear superimposed at a second plane at the top end 144 of the conduit. Appropriate optics (not shown in the figure for simplicity), including a beam splitting mirror and additional fixed lenses superimpose these two sets of mask images onto a common photo detector plane in detector 160 comprising a solid state imager optically coupled to the output of the conduit.

Figure 3:
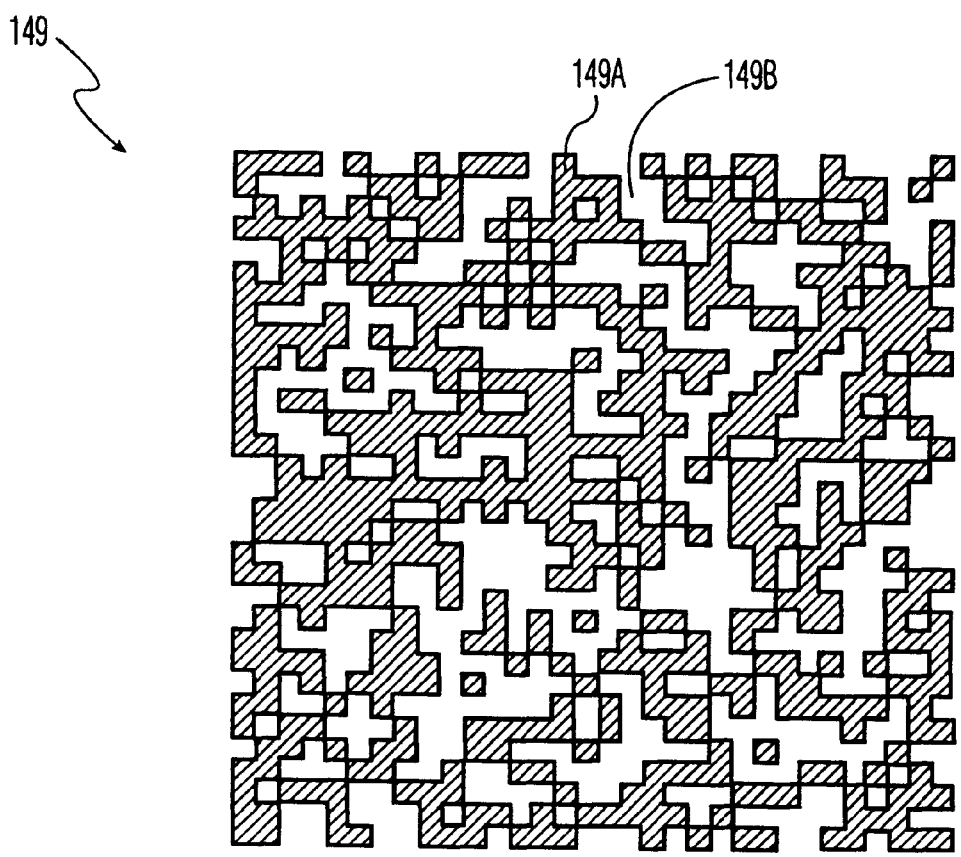
FIG. 3 is a schematic illustration of a low contrast random checker board masked pattern associated with a given image mask according an aspect of the present invention.

According to an aspect of the invention, the mask patterns associated with an image mask for each lens arrangement differ from one another other. Preferably, the image masks are low contrast pseudo random checkerboard patterns 149 having two levels of transparency as shown in FIG. 3. The masks are constrained to have an equal number of squares with each of the two transparency levels 149A, 149B, but their detailed structures are substantially uncorrelated. Each mask may be produced using a random number generator to determine coordinate indices of cells in the checkerboard which are to be darkened. The process continues until about half of the cells are darkened in this random manner, for example.

The clear cells are preferably as transparent as the photographic mask making process will permit. The attenuation of the darkened cells is chosen such that the combination of flash lamp brightness and the number of cascaded masks results in a brightness distribution at the solid state imager which is well matched to the useful dynamic range of the detector camera. This process typically results in a low contrast mask to prevent excessive attenuation which would result from cascading a large number of very dark high contrast masks. The larger the number of lenses and masks in the system, the more significant is the issue of realizing the desired light levels at the solid state imager. Reflection losses at lens surfaces, attenuation at the dark regions of the masks, and flash lamp brightness all become more significant issues as the number of mask-lens combinations increases. An analysis of mask contrast considerations and the expected light distribution at the solid state imager has been performed and appropriate parameter values appear feasible.

Under idling conditions the light source at the bottom of the conduit is turned off to conserve energy. When a data set is required, the solid state imager is erased and the flash lamp 120 at the bottom of tube 140 then illuminates the entire mask, set, yielding a single solid state imager frame containing the superimposed images of all of the masks along the conduit. This single video frame is read, digitized, and stored in a computer memory 165 via detector 160 (see FIG. 1). Subsequent data processing of the frame data recovers the transverse position of each of the masks in this composite image.

The masks are transparencies, multiplying the input light distribution by the local transmission value of the mask to obtain the local output value. Thus the superimposed mask images at the solid state imager detector plane are multiplied rather than added. By taking the logarithm of each resolution cell in the camera's image, the logarithms of the mask transparencies are added (instead of having the muliplicative relationship present in the raw data). Appropriate software sequentially cross correlates this additive composite image with the different reference patterns for each of the masks. The transverse positions of the correlation peaks for each of the masks indicate the corresponding transverse positions for the mask images.

Figure 4:
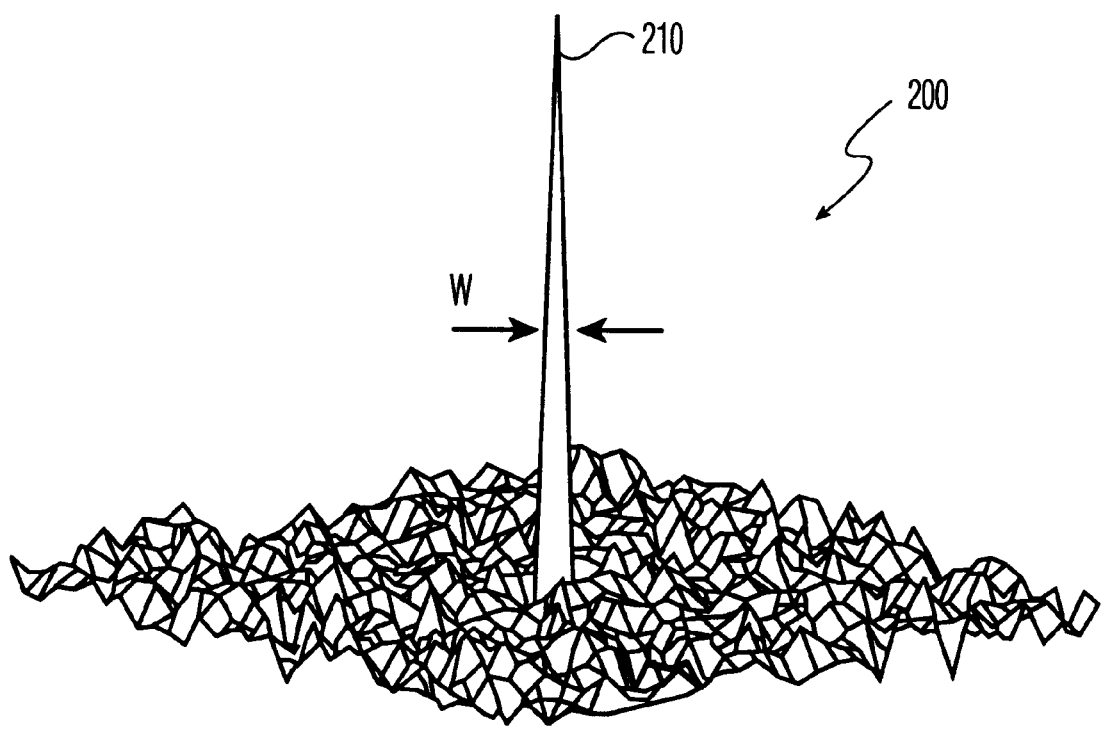
FIG. 4 is a schematic illustration of an auto correlation function associated with an image mask associated with the present invention.

FIG. 4 illustrates a typical auto correlation function 200 for such a random checkerboard pattern 149. The illustration is an actual plot of the auto correlation function for the mask shown in FIG. 3.

As the image of the mask moves with respect to the solid state imager sensing array due to deformations of the sensing conduit, the auto correlation function also moves accordingly. Thus by locating the transverse position of the peak of the auto correlation function, the corresponding transverse location of the mask image is determined. The detector 160 includes appropriate electronic circuitry such as a DSP chip, for example, for performing signal processing operations on the imaging data including performing correlation and auto correlation techniques on the data to obtain the peak positions.

The ratio of the squared value of the peak amplitude of this function to the mean squared value of the clutter over the base of the correlation field is defined as the Signal to Clutter Ratio (SCR). The exact SCR value for a particular mask depends on the details of that mask. It is a random variable over a set of such masks and has an expected value equal to the number of squares in the mask. (For the particular mask shown in FIG. 3 having 1024 squares, the actual measured SCR of the plot in FIG. 4 is 1105.)

Cross correlation of a given mask pattern with a different mask produces clutter at the same average level as that of the auto correlation function, but does not have the correlation peak associated with the auto correlation function. For an image of N superimposed masks, this results in the background clutter increasing by a factor of N with a corresponding reduction by a factor of N in the SCR.

It is evident from this that such a correlation technique can easily distinguish the correlation peak from the background clutter as long as the number of squares in each mask dominates over the number of masks in the system.

The number of lenses and corresponding masks required is determined by a combination of the spatial sampling interval required for the data, and the minimum bend radius that the deformed tube is expected to experience. The lenses should be at least as close together as required for the spatial data sampling points. In addition to this constraint, the effect of tube bending on the image should be considered.

As the images are relayed upward through the deformed tube, portions of adjacent lenses do not have an unobstructed path to all areas of neighboring masks. This results in some non-uniform brightness over the image as well as some cropping of the outer perimeters of the images. The net effect of many such random deformations is a gradual shading at the outer perimeter of the images, resulting in a loss of some of these cells. Such gradual fading at the outer perimeter of images is referred to as vignetting. The greater the bending between adjacent lenses, the greater this vignetting loss. The primary impact of this vignetting is to reduce the correlation peak value by the fraction of the lost cells.

The width w of the correlation peak 210 depends on the size of the squares, and is not effected by such vignetting. As long as this loss does not reduce the SCR to the extent that the correlation peak can be reliably distinguished from the background clutter via the detection circuitry, it is of little or no consequence. This is an advantageous feature in that it permits sparser lens spacing resulting in increased vignetting without any loss in the precision with which the lens displacements can be measured.

Having determined the positions of each of the images of the masks via a sequence of correlations in this manner, it remains to determine the actual transverse positions of each of the mask-lens combinations 145 along the length L of tube 140. The transverse position of the image depends on the transverse position of the mask as well as the positions of all of the intervening lenses used in relaying the image up the conduit to the solid state imager.

These are determined by first measuring the location of the uppermost mask-lens combination 145 in the tube. This has no intervening lenses other than the solid state imager lens (not shown) which is rigidly fixed to the camera within the detector unit so that it does not displace with conduit deformation. Upon determining the transverse position of the upper most lens, the location of the second lens from the top can be resolved from the position of its mask's image. With the positions of the upper two lenses thus deduced, the position of the third lens is calculated from the position of its mask's image. The sequential process is repeated until the positions of all the mask-lens combinations along the length of the conduit are obtained.

At the initial time of installation of the conduit, the positions of all of the lenses (and corresponding masks) and the corresponding profile of the conduit are determined. Subsequent measurements indicate the changes in the conduit deformation profile relative to a prior position. These changes constitute the desired earth movement data being monitored by the system. This data can be gathered at any desired time, either on a regularly scheduled basis or on command, for example. The data can be stored at the sensing site as long as desired and eventually transmitted to a central processing location 250. The transmission link 230 can employ phone lines, radio channels, or any other convenient conduit. The data transmission can automatically occur on a regular schedule or may be initiated via a request from the central location or by an alarm condition sensed at the monitoring site, for example. Power needs of the system according to the present invention are minimal and driven primarily by how often measurements are to be made and how often the telemetry link is activated.

The detector 160 may comprise a removable module coupled at the top of the conduit and containing a solid state imager, electronic circuitry including a digital signal processor for processing the image information, telemetry link, batteries, and the like. The use of a removable module detachable from the conduit permits recovering the module at the end of a monitoring mission. In this manner, only relatively inexpensive lenses and masks along with a flash lamp remain as expendable items buried with the sensing tube. The more expensive components are recoverable in the removable upper module.

Although the above discussion of the proposed lateral displacement profile monitoring system focuses on the application of monitoring sub surface earth movement, it is not restricted to such applications. For example, it may be desirable to monitor a building or a bridge or tower structure in an earthquake zone. The sensing tube described can be clamped along the side of such structures or in an elevator shaft of a tall building, for example. The system can monitor displacements at much higher rates than required for earth motion studies. The flash lamp can realize tens of flashes per second, permitting monitoring of vibrations that are earthquake driven. To prevent accumulation of a prohibitive quantity of data as well as conserving power and flash lamp life, the system can be activated by an automatic trigger that senses an earthquake disturbance or any other acceleration driver. The system can monitor slowly and continually under normal conditions, or may be activated to switch to a high data rate mode under appropriate conditions. Such deformation data accumulated over a time span of normal conditions can be compared with deformations occurring during an earthquake to determine the probable structural integrity after such an event.

Another potential application is in monitoring hydrophone towed array deformations. If a clear line of sight down the center of an array can be maintained without blockage by array hardware, for example the technique disclosed herein is directly applicable. The later displacement profile monitor and sensor system disclosed herein is an autonomous measurement system with considerable flexibility in its data rate and reporting capabilities. It can be used in a variety of applications involving infrequent measurements of transverse displacements over spans of hundreds of feet to monitoring low frequency vibrations over similar large spatial spans. The monitored data can be sent to a remote central base station using a variety of possible telemetry conduits, as is conventionally understood.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. For example, while the term conduit has been used primarily throughout the specification, it is understood that conduit is intended to include probes, tubes, pipes and other vessels that may be insertable into a cavity and containing the imaging devices contemplated herein. It is intended that the patent shall cover by suitable expression in the appended claims, whatever features of patentable novelty exist in the invention disclosed.

What is claimed is:

1. An apparatus for sensing deformations within a body comprising:
   a deformable conduit comprising a plurality of imaging devices at predetermined positions within said conduit, said plurality of imaging devices responsive to an optical source for providing imaging data, wherein said plurality of imaging devices includes a plurality of imaging masks and lenses; and
   a detector for processing said imaging data to obtain positional information indicative of movement of at least a portion of said conduit from a prior position.

2. The apparatus of claim 1, wherein at least a subset of said imaging devices each includes an imaging mask and lens combination.

3. The apparatus of claim 2, wherein each imaging mask includes a unique mask pattern.

4. The apparatus of claim 2, wherein each said imaging mask and lens combination is spaced apart from one another by about twice its focal length.

5. The apparatus of claim 1, wherein said detector comprises a solid state imager.

6. The apparatus of claim 5, wherein each of said plurality of imaging devices includes an image mask, and wherein said detector further comprises a correlator for correlating said image information from each of said imaging devices to obtain correlation peaks associated with the transverse positions of said image masks.

7. The apparatus of claim 1, further comprising a storage device coupled to said detector for storing the imaging information for later retrieval.

8. The apparatus of claim 2, wherein each imaging mask comprises a substantially random pattern.

9. The apparatus of claim 8, wherein said substantially random pattern comprises two levels of transparency.

10. The apparatus of claim 9, wherein said substantially random pattern comprises about equal proportions of said two levels of transparency.

11. A method for sensing deformations within a body comprising:
    inserting into said body an optical, deformable probe having a plurality of imaging devices spaced at predetermined positions within said probe;
    providing a light source for illuminating said probe;
    at a first time instant, processing first composite imaging information from at least a subset of said plurality of imaging devices in response to activation of said light source;
    at a second time instant, processing second composite imaging information from at least a subset of said plurality of imaging devices in response to activation of said light source; and
    comparing said processed first and second imaging information to obtain positional information indicative of movement of at least a portion of said probe occurring between said first and second time instants.

12. A method of sensing deformations within a cavity comprising:
    inserting into said cavity an optical, deformable probe having a plurality of imaging devices at predetermined positions within said probe;
    providing a light source illuminating said probe;
    receiving at an output of said probe, imaging information associated with said plurality of imaging devices in response to activation of said light source; and
    processing said imaging information using previous image information to obtain positional information indicative of movement of at least a portion of said probe from a prior position.

13. The method of claim 12, wherein the step of processing comprises correlating image data associated with at least of subset of said plurality of imaging devices.

14. The method of claim 12, wherein the step of processing comprises autocorrelating image data associated with each of said plurality of imaging devices to provide autocorrelation peaks, each autocorrelation peak associated with a respective one of said imaging devices.

15. The method of claim 14, wherein the step of processing further comprises determining the positions of each of said image devices based on said associated correlation peaks.

16. The method of claim 14, wherein each image device comprises a mask and lens combination.

17. The method of claim 12, wherein said plurality of image devices comprises a plurality of transparency masks.

18. The method of claim 17, wherein each of said plurality of transparency masks comprises a substantially random pattern.

19. An apparatus for sensing deformations within a body comprising:
    a deformable conduit having a longitudinal axis and a plurality of imaging devices positioned within said conduit and longitudinally separated from one another, said plurality of imaging devices responsive to an optical source for providing imaging data; and
    a detector for processing said imaging data to obtain positional information indicative of movement of at least a portion of said conduit from a prior position.

20. The apparatus of claim 19, wherein said plurality of imaging devices is responsive to an optical source that is positioned about a first end of the conduit, and wherein the detector is positioned about a second end of the conduit.

21. An apparatus for sensing deformations within a body comprising:
    a deformable conduit comprising a plurality of imaging devices at predetermined positions within said conduit, said plurality of imaging devices responsive to an optical source for providing imaging data; and
    a detector for processing said imaging data to obtain positional information indicative of movement of at least a portion of said conduit from a prior position, wherein each of said plurality of imaging devices includes an image mask, and wherein said detector further comprises a correlator for correlating image information from each of said imaging devices to obtain correlation peaks associated with the transverse positions of said image masks.

22. An apparatus for sensing deformations within a body comprising:
    a deformable conduit;
    an optical source positioned at a first end of the conduit;
    an optical detector positioned at a second end of the conduit; and
    a plurality of imaging devices disposed within the conduit between the source and the detector, said imaging devices being responsive to the optical source for providing imaging data to the detector, and said detector being operative for processing said imaging data to obtain positional information indicative of movement of at least a portion of said conduit from a prior position.

* * * * *